Feb. 17, 1953  C. O. FIEDLER  2,628,401
APPARATUS FOR REMOVING AIR FROM CERAMIC MATERIALS
Filed Jan. 22, 1952  2 SHEETS—SHEET 1
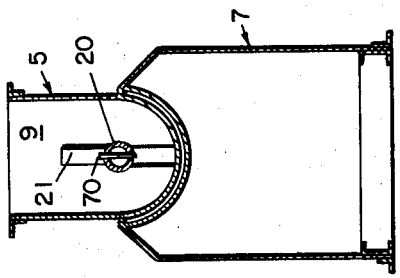
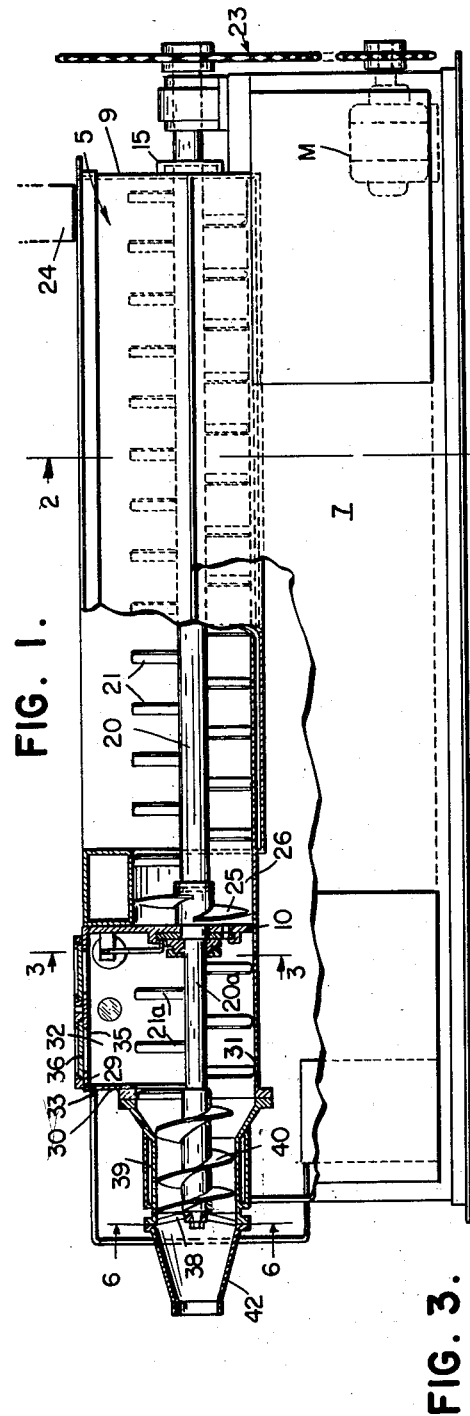
INVENTOR
CLIFFORD O. FIEDLER
BY
ATTORNEYS Feb. 17, 1953          C. O. FIEDLER          2,628,401
APPARATUS FOR REMOVING AIR FROM CERAMIC MATERIALS
Filed Jan. 22, 1952          2 SHEETS—SHEET 2
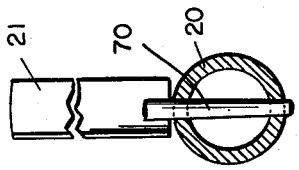
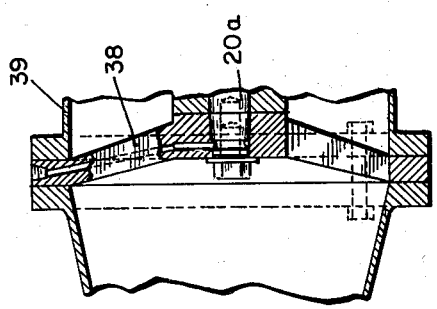
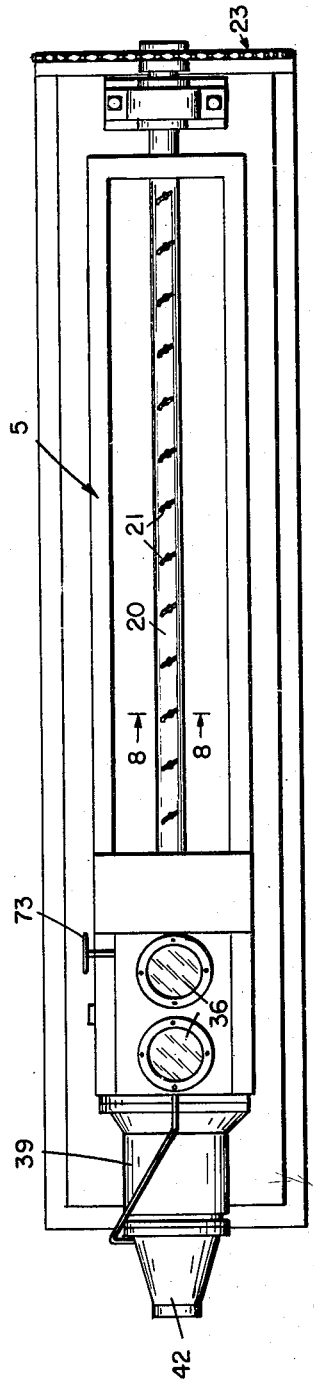
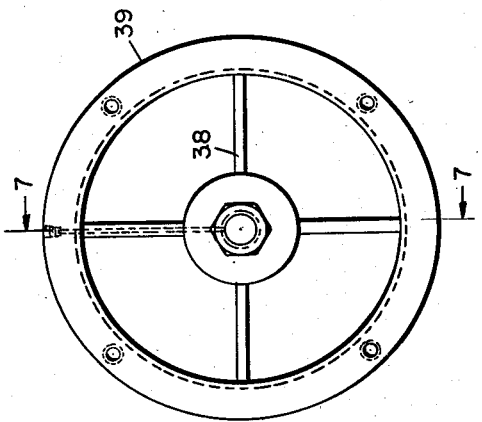
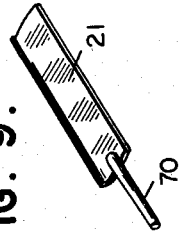
INVENTOR
CLIFFORD O. FIEDLER
BY Mason & Graham
ATTORNEYS Patented Feb. 17, 1953

2,628,401

UNITED STATES PATENT OFFICE 2,628,401

APPARATUS FOR REMOVING AIR FROM CERAMIC MATERIALS

Clifford O. Fiedler, San Gabriel, Calif.

Application January 22, 1952, Serial No. 267,641

4 Claims. (Cl. 25—11)

My present invention has to do with apparatus for preparing and extruding plastic or ceramic materials preparatory to molding them.

In the preparation of such materials for molding it is essential not only to finely comminute them but also to remove gases and air therefrom, since if the clays are not finely and evenly comminuted and if they contain air or gas, the quality of the molded product is poor. In the preparation of such clays, it has been customary, during the comminuting or mixing operation, to pass them through a vacuum chamber for the purpose of removing air and gases, but since the vacuum chamber must of course be maintained sealed from atmosphere, certain difficulties have been presented. For instance inasmuch as the clays must pass into and out of the chamber considerable difficulty has been experienced in maintaining the necessary plug of impacted material at the inlet to effectively maintain the chamber sealed from atmosphere. While the consistencies of some clays have rendered it easy to maintain such a seal, the consistencies of other clays have rendered it practically impossible to maintain an effective seal.

It is therefore an object of my invention to provide an apparatus of this character wherein I overcome this old problem by providing a construction by which it is possible to adjust the size of the extrusion orifices in the wall of the vacuum chamber at the point at which the shaft carrying the comminuting blades passes through the wall.

It is also an object to provide apparatus in which, by virtue of its construction, I am able to arrange all the parts in linear relation so that the machine is more compact and efficient.

Other objects and advantages will appear hereinafter.

Without intending thereby to limit the broader scope of the invention, except as may appear from the appended claims, I shall now describe a presently preferred apparatus embodying my invention, for which purpose I shall refer to the accompanying drawings wherein:

Fig. 1 is a view partly in side elevation and partly in longitudinal section;

Fig. 2 is a section taken on line 2—2 of Fig. 1;

Fig. 3 is an enlarged section taken on line 3—3 of Fig. 1;

Fig. 4 is a section taken on line 4—4 of Fig. 3;

Fig. 5 is a top plan view of Fig. 1;

Fig. 6 is an enlarged section taken on line 6—6 of Fig. 1;

Fig. 7 is a section taken on line 7—7 of Fig. 6;

Fig. 8 is a sectional view showing the mounting of the comminuting blades upon the shaft; and Fig. 9 is a perspective of one of the comminuting blades.

Referring now to the accompanying drawings:

The numeral 5 denotes an open topped casing supported upon a base 7.

The casing has a right end wall 9 and a left end wall 10 providing journals 15, 16 for shaft 20 which carries comminuting blades 21 of the pug mill type, pitched to advance the clay longitudinally of the casing towards end wall 10. Shaft 20 is driven as by a motor M through conventional chain and sprockets 23.

The raw clay or other plastic material to be prepared is fed into the right hand end of the casing through a conduit 24 from a conventional hopper, not shown. Adjacent wall 10 shaft 20 carries a helical screw 25, so that when the shaft is rotated a plug of the material is maintained in the cylindrical plug chamber 26 against wall 10.

Walls 29, 30 and 31, together with wall 10, define a vacuum chamber 32, from which air is evacuated through an outlet opening 33 by means of a vacuum pump, not shown. Top wall 29 of the chamber is provided with inspection openings 35 having cover glasses 36 in sealing engagement therewith.

An extension portion 20a of the shaft, which is preferably although not necessarily of reduced diameter, extends through chamber 32 and carries comminuting blades 21a, the shaft portion 20a being journaled at its left end in a spider 38 mounted at the discharge end of a reduced cylindrical portion 39 of the vacuum chamber, the left end portion of the shaft carrying a helical screw 40 which maintains a plug of material within the conical extrusion nozzle 42.

While, with some materials it is relatively easy to maintain a suitable plug seal of the material in chamber 26 against wall 10; with other materials it is difficult. So as to enable my apparatus thereby to handle materials of all types, I provide an adjustable extrusion member in association with wall 10 of the vacuum chamber and which will now be described.

Wall 10 has, radially spaced from the shaft, a circumferential row of extrusion orifices 50, and against wall 10, and coaxial with the shaft, I rotatably mount a disc 52, also having a circumferential row of extrusion orifices arranged to be moved into and out of register with orifices 50 upon rotation of the disc relative to wall 10.

To mount disc 52, I secure a ring 57 to wall 10, as by screws 58, the rings having an inwardly disposed annular flange 59 which bears against the outer surface of the disc adjacent the periphery of the latter, so that the disc may rotate in the ring. A collar consisting of sections 66—61, secured together by screws 63 rotatably fits around shaft portion 20a and is locked to disc 52 by pins 65a.

To rotate the disc 52, it is provided with a bifurcated radial arm 65. Through a side wall of the chamber 32 a tubular housing 67 extends. The housing has a right end wall 68 and the left end carries a screw plug 69. Operating shaft 70 is threadedly mounted in plug 69 and extends through said plug and through wall 68, carrying an annulus 72 adjacent its outer end, which engages between the bifurcations of arm 65, so as to swing the arm 65 in response to rotation of shaft 70. The other end of the shaft carries a hand wheel 72 for manual operation. The interior of the housing 67 may carry a rubber lining sleeve 75 so as to function as a seal. A fixed stop 76 is secured to wall 10 in position to be engaged by the arm 65 at one extreme of its movement, and the inner end of the housing 67 functions as a stop to be engaged by the arm at the other extreme of its movement.

In Fig. 8 I show the manner in which the blades 21 are mounted on the shaft 20, which is by means of the pin 70 extending through diametrically opposite holes in the shaft and being welded at its outer end to the blade.

From the foregoing it is apparent that if the material being prepared in the apparatus is of a consistency which would pass too freely through orifices 50 to enable an effective plug seal to be maintained in the vacuum chamber, the rate of extrusion of the material through orifices 50 may be regulated by turning the shaft 70 to rotate the disc 52 until the orifices 55 are out of coaxial register with orifices 50.

It is also apparent that, by virtue of the novel means which I employ to maintain an effective seal for the vacuum chamber, it is possible to utilize a single shaft with its carried blades and screws and thus provide a more compact and efficient apparatus.

I claim:

1. In apparatus for preparing plastic materials for molding, the combination of a casing for receiving the material, walls defining a vacuum chamber, the first of said walls forming an end wall for said casing, a discharge outlet opening through an opposite wall of said chamber, a shaft extending longitudinally of said casing and chamber and into said outlet opening, said shaft being journalled for rotation in said first wall, comminuting elements on said shaft pitched to move said material toward said opening; said first wall having extrusion apertures therethrough, and means cooperating with said apertures to open and close the same, said means comprising a disc mounted to rotate against said first wall and having apertures positioned to be moved into and out of register with the apertures in the first wall in response to rotation of said disc.

2. In apparatus for preparing plastic materials for molding, the combination of a casing for receiving the material, walls defining a vacuum chamber, the first of said walls forming an end wall for said casing, a discharge outlet opening through an opposite wall of said chamber, a shaft extending longitudinally of said casing and chamber and into said outlet opening, said shaft being journalled for rotation in said first wall, comminuting elements on said shaft pitched to move said material toward said opening; said first wall having extrusion apertures therethrough, and means cooperating with said apertures to open and close the same, and means comprising a disc mounted to rotate against said first wall coaxial with and relative to said shaft and having apertures positioned to be moved into and out of register with the apertures in the first wall in response to rotation of said disc.

3. The apparatus of claim 1 wherein there is a coaxial extrusion nozzle mounted in communication with said discharge outlet opening.

4. In apparatus for preparing plastic materials for molding, the combination of a casing for receiving the material, walls defining a vacuum chamber, the first of said walls forming an end wall for said casing, a discharge outlet opening through an opposite wall of said chamber, a shaft extending longitudinally of said casing and chamber and into said outlet opening, said shaft being journalled for rotation in said first wall, comminuting elements on said shaft pitched to move said material toward said opening; said first wall having extrusion apertures therethrough, means cooperating with said apertures to open and close the same comprising a disc mounted to rotate against said first wall coaxially with and relative to said shaft and having apertures positioned to be moved into and out of register with the apertures in the first wall in response to rotation of said disc and means for rotatably securing said disc against said first wall comprising a ring secured to said first wall.

CLIFFORD O. FIEDLER.

REFERENCES CITED

The following references are of record in the file of this patent:

UNITED STATES PATENTS

| Number | Name | Date |
|---|---|---|
| 124,431 | Fuller | Mar. 12, 1872 |
| 1,478,842 | Staley | Dec. 25, 1923 |
| 1,964,266 | McElroy et al. | June 26, 1934 |
| 2,186,331 | Flood et al. | Jan. 9, 1940 |